Dec. 1, 1925.                                                          1,564,092
                              M. MILLER
                             TIRE CHANGER
                         Filed Dec. 26, 1924            2 Sheets-Sheet 1

Matthias Miller, INVENTOR.

BY

Geo. P. Kimmel, ATTORNEY.

Dec. 1, 1925.

M. MILLER

TIRE CHANGER

Filed Dec. 26, 1924

Matthias Miller, INVENTOR.

BY Geo. P. Kimmel ATTORNEY.

Patented Dec. 1, 1925.

1,564,092

UNITED STATES PATENT OFFICE.

MATTHIAS MILLER, OF GAINESVILLE, FLORIDA.

TIRE CHANGER.

Application filed December 26, 1924. Serial No. 758,249.

*To all whom it may concern:*

Be it known that I, MATTHIAS MILLER, a citizen of the United States, residing at Gainesville, in the county of Alachua and State of Florida, have invented certain new and useful Improvements in Tire Changers, of which the following is a specification.

This invention relates to devices for removing wheel rims from yieldable tires, or inserting them therein, and has for one of its objects to improve the constructions and increase the efficiency and utility of devices of this character.

Another object of the invention is to provide a device of this character, which may be adapted without material structural change to be operated on tires and rims of various sizes.

With these and other objects in view, the invention consists in certain novel features of construction as hereinafter shown and described and then specifically pointed out in the claims, and in the drawings illustrative of the preferred embodiment of the invention—

Figure 1:
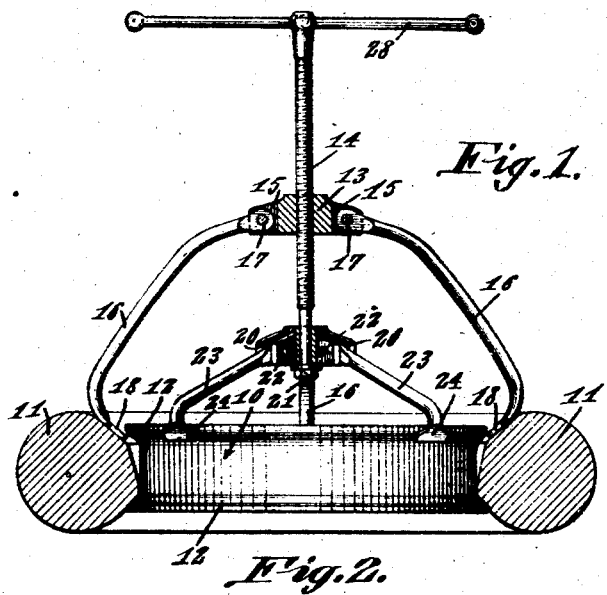
Fig. 1 is an elevation, partly in section, of the improved device arranged to remove a rim from a tire.
Figure 2:
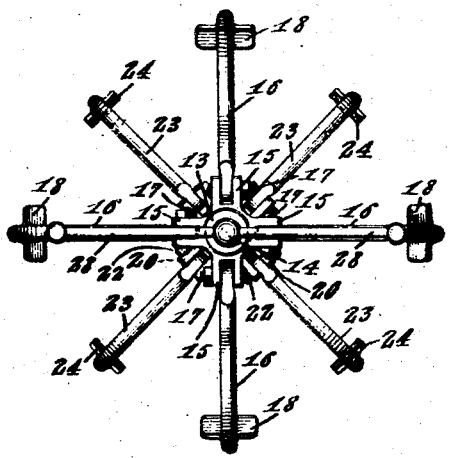
Fig. 2 is a plan view of the improved device.

The improved device is designed for use in withdrawing endless tire rims from rubber or composition tires, the rim being represented as a whole at 10 and the tire at 11, of the usual construction, the rim having the usual clincher flanges 12 at the edges to receive the annular tire.

In applying the rim to the tire or the tire to the rim, in the ordinary manner, the tire is forced over the rim, which requires considerable force, and the tire must be expanded to enable it to pass over one of the flanges, and the principal object of the present invention is to provide a simply constructed device whereby the tire may be expanded and the rim forcibly drawn from its position within the rim while the tire is thus expanded, and likewise to expand the tire and force the rim into the tire while thus expanded.

The improved device comprises a nut or head element 13 in which a relatively heavy rod 14 operates the rod being preferably threaded, and the nut device provided with a plurality of spaced ears 15 between each pair of which a pull member 16 is pivoted at one end at 17.

At their lower ends each of the pull members 16 is formed with a laterally directed foot member 18 adapted to bear against the inner face of the tire 11, as shown.

At its lower end the rod 14 pivotally engages a sleeve device 19 having spaced radiating ears 20, the sleeve being slidable to a limited extent on the rod 14, and held from movement in one direction by a stop nut 21.

An arm 23 is pivoted at 22 between each pair of the ears 20 and each formed with inwardly directed hook portion 24 at the lower end to engage over the outer face of the adjacent clincher flange 12 of a wheel rim, as shown.

Figure 3:
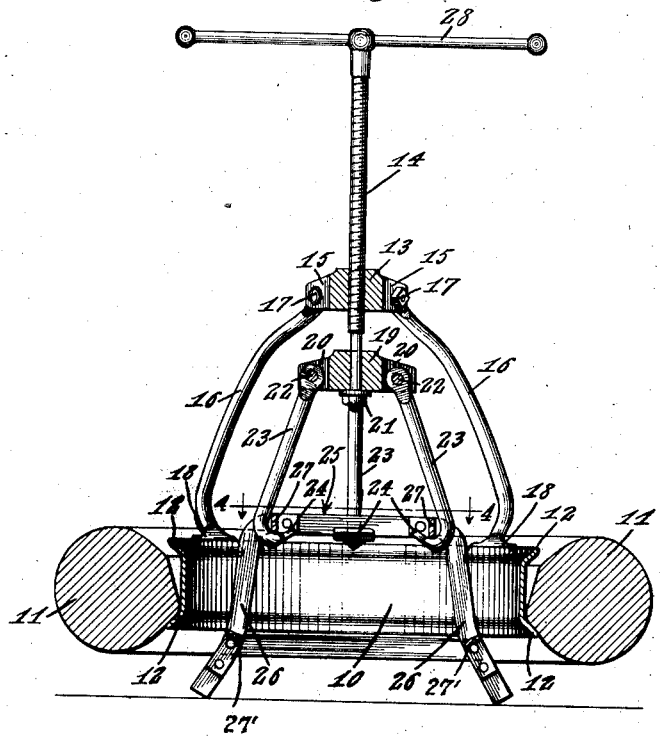
Fig. 3 is a view similar to Fig. 1 illustrating the manner of employing the improved device for applying a tire to a rim.
Figure 4:
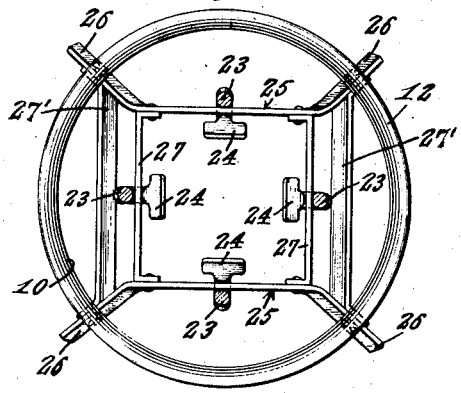
Fig. 4 is a plan view of the rim supporting portion of the device with the pull rods in section on the line 4—4 of Fig. 3.

The device thus far described is adapted for use in withdrawing the rim from the tire, and to enable the rim to be forcibly inserted into the tire, a supporting rack or frame illustrated in Figs. 3 and 4, is employed and constitutes side members each formed with a horizontal portion 25 and directed outwardly at the ends as shown at 26. The horizontal portions 25 are connected by tie members 27, while the obliquely directed portions 26 are connected by stay members 27'. The horizontal portions 25 of the side members and the upper stay members 27, form a square frame beneath which the terminal hooks 24 of the swinging members 23 engage as shown in Figures 3 and 4.

To withdraw the rim 10 from the tire 11, the device is arranged as shown in Fig. 1, with the hook portions 18 of the arms 16 against the inner face of the tire 11 and the foot portions 24 of the arms 23 beneath the outer face of the adjacent flange 12 of the rim. The threaded member 14 is then rotated by power applied to the turning lever 28 to cause the threads thereof to force the nut member 13 toward the tire and thus cause the arms 16 to expand and correspondingly expand the tire. At the same time that the nut member 13 is forced toward the tire, the sleeve 19 is forced toward the nut member 13 and causes the arms 23 to be drawn inward, and the hooks 24 caused to grip the outside of the rim and beneath the adjacent flange 12, and exerts a strong pulling force on the rim, and draws it from the expanded tire.

To force the rim into the tire, the supporting rack is located upon a stationary body, for instance a floor, and the rim 10 located thereon and resting on the obliquely directed portions 26 as indicated in Figs. 3 and 4. The tire is then located upon the upper portion of the rim and the operating device arranged with the feet 18 of the arms 16 against the interior of the tire as before and the hooks 24 of the arms 23 located beneath the portions 25 and 27, also as shown in Figs. 3 and 4. The member 14 is then rotated as before, with the result of expanding the tire and holding the supporting frame and the rim support thereby from movement away from the tire, and correspondingly forcing the tire over the rim.

When the rim is disposed in position within the tire, the motion of the member 14 is reversed, to release the parts and permit the removal of the device.

The improved device is simple in construction, can be constructed wholly of metal and operates effectually for the purpose described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed is:

1. A tire changer, comprising a threaded member, a nut device engaging said threaded member, a plurality of arms swingingly coupled to said nut device and each provided with a gripping element at the free end adapted to engage a wheel tire, a sleeve device in which said threaded member is rotative, and a plurality of arms swingingly coupled to said sleeve and each formed with a terminal hook at the free end adapted to engage over the adjacent clincher flange of a wheel rim.

2. A tire changer, comprising a threaded member, a nut device engaging said threaded member, a plurality of arms swingingly coupled to said nut device and each provided with a rigid inturned foot portion at the free end adapted to bear against a wheel tire and press the latter outwardly, a sleeve device in which said threaded member is rotative, a plurality of arms swingingly coupled to said sleeve and each formed with an inwardly directed hook at the free end, and a rack device adapted to support a wheel rim and including upper members over which the terminal hooks of the last mentioned arms are adapted to engage.

3. A tire changer comprising a rod, a member movable longitudinally of said rod, a member in which said rod is rotative, a plurality of arms swinging relative to said movable member and each having a grip element at its free end, a plurality of arms swinging relative to said rotative member and each having a grip element at its free end, and means for forcing said movable member longitudinally of said rod.

4. A tire changer, comprising a rod, a member movable longitudinally of said rod, a member in which said rod is rotative, a plurality of arms swinging relative to said movable member and each having a grip element at its free end adapted to engage the inner face of a tire, a plurality of arms swinging relative to said rotative member and each having an inturned hook at its free end, a frame adapted to support a wheel rim and over which the inturned hooks of the last mentioned arms are adapted to engage, and means for forcing said movable member longitudinally of said rod.

In testimony whereof, I affix my signature hereto.

MATTHIAS MILLER.